United States Patent
Mullins et al.

(10) Patent No.: US 9,727,977 B2
(45) Date of Patent: Aug. 8, 2017

(54) SAMPLE BASED COLOR EXTRACTION FOR AUGMENTED REALITY

(71) Applicant: DAQRI, LLC, Los Angeles, CA (US)

(72) Inventors: Brian Mullins, Sierra Madre, CA (US); Matthew Kammerait, West Hollywood, CA (US); Mark Sararu, Los Angeles, CA (US); Andrew Krage, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 14/584,855

(22) Filed: Dec. 29, 2014

(65) Prior Publication Data

US 2016/0189397 A1    Jun. 30, 2016

(51) Int. Cl.
G09G 5/00 (2006.01)
G06T 7/40 (2017.01)
G06T 19/00 (2011.01)
G06T 7/90 (2017.01)

(52) U.S. Cl.
CPC ............... G06T 7/408 (2013.01); G06T 7/90 (2017.01); G06T 19/006 (2013.01)

(58) Field of Classification Search
None
See application file for complete search history.

(56) References Cited

U.S. PATENT DOCUMENTS

| | | | |
|---|---|---|---|
| 7,991,220 B2 * | 8/2011 | Nagai | A63F 3/00643 345/633 |
| 2005/0180659 A1 * | 8/2005 | Zaklika | G06T 5/00 382/309 |
| 2011/0016390 A1 * | 1/2011 | Oh | G06F 3/0482 715/702 |
| 2011/0261050 A1 | 10/2011 | Smolic et al. | |
| 2012/0075484 A1 * | 3/2012 | Kawamoto | G06T 19/006 348/207.1 |
| 2014/0132629 A1 | 5/2014 | Pandey et al. | |
| 2014/0139552 A1 * | 5/2014 | Morinaga | G06T 19/006 345/633 |
| 2015/0187136 A1 * | 7/2015 | Grimaud | G06T 17/00 345/420 |
| 2015/0243084 A1 * | 8/2015 | Kanemaru | G06T 19/006 345/426 |

(Continued)

FOREIGN PATENT DOCUMENTS

WO WO-2016109250 A1 7/2016

OTHER PUBLICATIONS

"International Application Serial No. PCT/US2015/066643, International Search Report mailed Mar. 11, 2016", 2 pgs.

(Continued)

*Primary Examiner* — Ryan R Yang
(74) *Attorney, Agent, or Firm* — Schwegman Lundberg & Woessner, P.A.

(57) ABSTRACT

A system and method for sampling-based color extraction for augmented reality are described. A viewing device includes an optical sensor to capture an image of a real-world object. A color extraction software divides the captured image into multiple regions or recognizes pre-defined regions and identifies a color value for each region. A color-based augmented reality effect module retrieves a virtual content based on the color values for the regions, and delivers the virtual content in the viewing device.

19 Claims, 16 Drawing Sheets

(56) References Cited

U.S. PATENT DOCUMENTS

2015/0356785 A1\* 12/2015 Takemoto ............. G06T 19/006
　　　　　　　　　　　　　　　　　　　　　　　　345/633
2016/0078680 A1\* 3/2016 Reif ..................... G06T 19/006
　　　　　　　　　　　　　　　　　　　　　　　　345/633

OTHER PUBLICATIONS

"International Application Serial No. PCT/US2015/066643, Written Opinion mailed Mar. 11, 2016", 5 pgs.

\* cited by examiner

SAMPLE BASED COLOR EXTRACTION FOR AUGMENTED REALITY

TECHNICAL FIELD

The subject matter disclosed herein generally relates to the processing and visualization of data. Specifically, the present disclosure addresses systems and methods for extracting sample color values of an image for use in augmented and mixed reality.

BACKGROUND

An augmented reality (AR) device can be used to generate and display data in addition to an image captured with the device. For example, AR provides a live, direct or indirect view of a physical, real-world environment whose elements are augmented by computer-generated sensory input such as sound, video, graphics or GPS data. With the help of advanced AR technology (e.g., adding computer vision and object recognition), the information about the surrounding real world of the user becomes interactive. Device-generated (e.g., artificial) information about the environment and its objects can be overlaid on the real world.

AR devices can also be used to capture color information of an image of a real world physical object. However, when attempting to recognize or identify color values, the device can be overwhelmed with the resulting computational load. The number of color value computations increases with the resolution of the captured image, specificity of the color space being identified, and many other factors. Thus, the AR device may not have sufficient computational resources to extract the color value of every pixel and further render three-dimensional models of virtual objects and complex animations, especially when the computation all happens on the local device.

BRIEF DESCRIPTION OF THE DRAWINGS

Some embodiments are illustrated by way of example and not limitation in the figures of the accompanying drawings.

DETAILED DESCRIPTION

Figure 1:
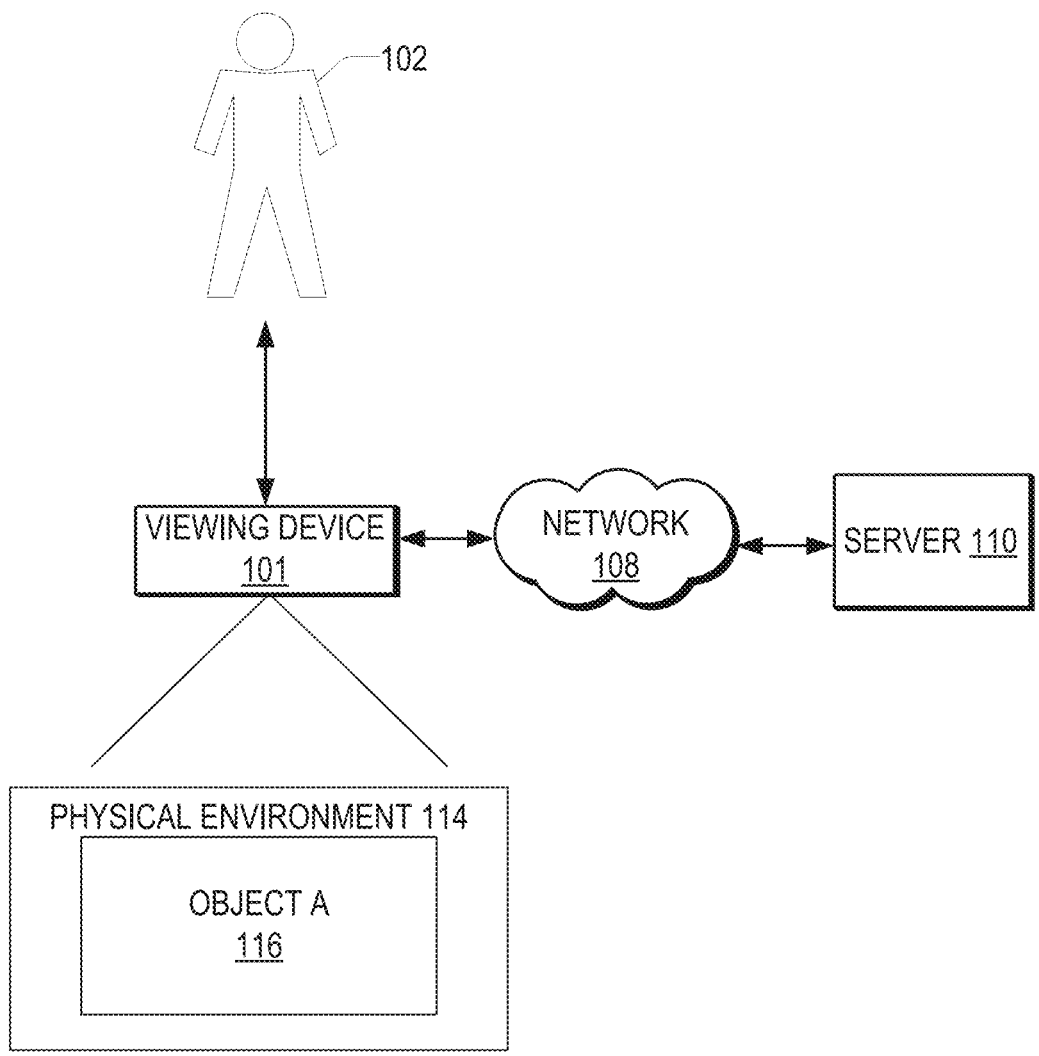
FIG. 1 is a block diagram illustrating an example of a network environment 100 suitable for implementing an augmented reality system, according to some example embodiments.

Example methods and systems are directed to sample-based color extraction of an image for an augmented reality (AR) system and using the sampled color values to generate a virtual object in the AR system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object such as a three-dimensional virtual object overlaid on an image of a physical object captured with a camera of a viewing device. The physical object may include a visual reference (e.g., a recognized image, pattern, or object) that the augmented reality application can identify. A visualization of the additional information, such as the three-dimensional virtual object overlaid or engaged with an image of the physical object, is generated in a display of the viewing device. The three-dimensional virtual object may be selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional or a two-dimensional virtual object. For example, the three-dimensional virtual object may include a three-dimensional model of a toy or an animated dinosaur. The two-dimensional virtual object may include a two-dimensional view of a dialog box, menu, or written information such as statistics information for properties or physical characteristics of the object (e.g., temperature, humidity, color). An image of the virtual object may be rendered at the viewing device or at a server in communication with the viewing device.

A user may view the virtual object visually perceived as an overlay onto the image or a view of the real-world object using a viewing device. The viewing device may include a mobile computing device such as a smartphone, a head mounted display system, computing glasses, and other types of wearable devices. The viewing device may include a system for sample-based color extraction for AR. In one example embodiment, the viewing device includes an optical sensor to capture an image of a real-world object. A sample-based color extraction module of the viewing device breaks down the captured image into multiple regions and identifies a color value for each region, which may be an average, a pass/fail check against a range, or other color related identification or comparison. A color-based AR effect module retrieves or creates virtual content based on the color values for the plurality of regions and characteristics (e.g., specific animation, behavior, color, effect) associated with the virtual content. The viewing device then generates a visualization of the virtual content in a display of the viewing device.

In one example embodiment, the viewing device divides the captured image into multiple regions. Each region includes sample pixel color values within a predefined threshold. The size of each region may be determined based on color value variations within each corresponding region. For example, the size of a region increases when the color value variations exceed an upper threshold. The size of a region decreases when the color value variations fall below a lower threshold.

For example, the viewing device may compute a median color value for each region. For example, the viewing device selects sample pixels within a region and computes the median color value based on the sample pixels within the region.

In one example embodiment, the viewing device retrieves the virtual content corresponding to the color value associated with one or more regions and renders a three-dimensional model of the virtual content in the display of the viewing device. The three-dimensional model is visually perceived in the viewing device as an overlay on top of the captured image or a view of the real world object.

The viewing device may retrieve a characteristic of the virtual content associated with the color value corresponding to one or more regions. The viewing device then renders a visualization of the characteristic of the virtual content in the display of the viewing device. The characteristic includes, for example: an animation or a color of the virtual content, a first animation of a virtual object associated with a first color value of one or more regions, a second animation of the virtual object associated with a second color value of one or more regions, a first color of the virtual object associated with the first color value of one or more regions, and a second color of the virtual object associated with the second color value of one or more regions.

In one example embodiment, the viewing device includes a head-mounted device comprising a transparent display that displays the visualization of the virtual content visually perceived as an overlay to a real-world object.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for implementing an AR system, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 2 and 5.

The server 110 may be part of a network-based system. For example, the network-based system includes a cloud-based server system that provides additional information, such as three-dimensional models or other virtual objects and corresponding characteristics, to the viewing device 101 based on a color value of a region in a captured image.

A user 102 may utilize the viewing device 101 to capture a view of a real world physical environment 114 (e.g., a room, a desk, a hallway) having one or more physical objects (e.g., object A 116—such as a piece of paper, a magazine, a child's toy, markings on a floor in a factory) viewed by the user 102. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, a wearable computing device (e.g., watch or glasses), or a head-mounted computing device (e.g., helmet). A tablet computer may be held up to view the object A 116 through a display of the table computer. The computing device may be hand held or may be removably mounted to the head of the user 102. In one example, the display may be a screen that displays what is captured with a camera of the viewing device 101. In another example, the display of the viewing device 101 may be transparent or semi-transparent such as in lenses of wearable computing glasses or the visor of a helmet.

The user 102 may be a user of an AR application in the viewing device 101 and at the server 110. The AR application in the viewing device 101 may optionally communicate with AR application in the server 110 to access AR content. The AR application may provide the user 102 with an augmented experience triggered by identified objects and/or colors of the identified objects in the physical environment 114. The augmented experience may be in the form of a virtual object based on color values within the captured image of the real world object A 116. In one example embodiment, the nature and behavior of the virtual object may be based on the captured color of the object A 116. The nature of the virtual object may refer to the type of virtual object being displayed in the viewing device 101. For example, a red color value may be associated with a virtual fire log. A blue color value may be associated with virtual ocean waves. The virtual object may already have predefined behaviors such as flaming or crackling fire from the virtual fire log, or splashing mist from crashing waves. The behavior of the virtual object may refer to how the virtual object is animated or behaves in response a color value. For example, a bright red color value may cause the virtual fire log to burst in flames. A light blue color value may cause the virtual waves to move gently.

In another example, the viewing device 101 retrieves and displays a virtual object (e.g., a virtual dog) that is associated with a color (e.g., brown) of the object A 116 (e.g., brown coloring in an outline of a drawing of a dog on a piece of paper). In another example, the virtual object may act or behave in a specific manner based on the color in specific portions of the object A 116. For example, a red color on the collar of the dog in the drawing causes the viewing device 101 to animate the virtual brown dog to jump and bark. A yellow color on the collar of the dog may cause the virtual brown dog to sit and wag his tail.

The physical environment 114 may include identifiable objects such as a two-dimensional physical object (e.g., a picture of a dog), a three-dimensional physical object (e.g., a toy or an action figure), a location (e.g., at the bottom floor of a house), or any references (e.g., perceived corners of walls or furniture) in the real world physical environment 114. For example, the user 102 may point a camera of the viewing device 101 to capture an image of real world object (e.g., object A 116).

In one example embodiment, the objects in the image are tracked and recognized locally in the viewing device 101 using a local context recognition dataset or any other previously stored dataset of the augmented reality application of the viewing device 101. The objects in the image may be recognized patterns on a drawing (e.g., dogs, characters, scenery). The local context recognition dataset module may include a library of virtual objects associated with real-world physical objects or references. In one example, the viewing device 101 identifies feature points in an image of the object A 116 to determine different planes (e.g., edges, corners, surface). The viewing device 101 also identifies tracking data related to the object A 116 (e.g., GPS location, orientation and position of the object A 116 relative to the viewing device 101, etc.). In another example embodiment, if the captured image is not recognized locally at the viewing device 101, the viewing device 101 downloads additional information (e.g., the three-dimensional model) corresponding to the captured image from a database of the server 110 over the network 108.

In another example embodiment, the object A 116 in the captured image is tracked and recognized remotely at the server 110 using a remote context recognition dataset or any other previously stored dataset of an AR application at the server 110. The remote context recognition dataset module may include, for example, a library of virtual objects and characteristics associated with detected colors of the object A 116. For example, the viewing device 101 may have a limited library of a context recognition dataset. If the viewing device 101 does not recognize a pattern or a drawing, the viewing device 101 sends an image of the drawing to the server 110 to determine a new virtual object associated with a portion of the image of the drawing. The viewing device 101 then downloads the new virtual object from the server 110. In another example, the viewing device 101 recognizes the object A 116 and queries the server 110 for updates to virtual objects associated with the object A 116. For example, the viewing device 101 recognizes a colored drawing of a cartoon character and queries the server 110 for additional effects related to the cartoon character. The viewing device 101 determines that a new power (e.g., firing a laser gun) is available for the cartoon character and downloads the updated virtual object (e.g., 3D model of a virtual character firing a laser gun) or new feature for the virtual object. Other features may include additional accessories for the cartoon character. For example, a new dress or a tiara is available for the virtual character associated with the colored cartoon character.

As such, the nature of a virtual object (e.g., a three-dimensional model of a truck) may be determined based on a combination of the recognized object A 116 (e.g., a drawing of a truck) and the color of the object A 116 (e.g., the truck is red). Furthermore, the behavior of the virtual object (e.g., music, sound, and animation of a steam train engine) may be determined based on a combination of the recognized object A 116 (e.g., a drawing of a steam train) and the color of the object A 116 (e.g., the train is blue).

In another example embodiment, the viewing device 101 includes sensors to measure physical properties of the object A 116. Examples of measured physical properties may include and but are not limited to color, shades, weight, pressure, temperature, velocity, direction, position, intrinsic and extrinsic properties, acceleration, and dimensions. The sensors may also be used to track the location, movement, and orientation of the viewing device 101. The sensors may include optical sensors (e.g., depth-enabled 3D camera), wireless sensors (Bluetooth, Wi-Fi), GPS sensor, and audio sensor to determine the location of the viewing device 101, the orientation of the viewing device 101 to track what the user 102 is looking at (e.g., a direction at which the viewing device 101 is pointed, e.g., the viewing device 101 is pointed towards a drawing on a wall or on a table, markings on a floor). The sensors may be embedded in a head-mounted device.

In another example embodiment, data from the internal sensors in the viewing device 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, with which features of the virtual object the user 102 interacted (e.g., such as whether a user 102 tapped on a part of the virtual object—a user pets a virtual dog on the head), and any suitable combination thereof. The tracking may be performed by tracking the position of the viewing device 101 relative to the object A 116, or by using front cameras in the viewing device 101 to track an eye gaze of the user 102.

The viewing device 101 may be determine and quantify resources available to capture color values from different regions in an image. The viewing device 101 may offload computation to the server 110 based on the available resources at the viewing device 101. Specific computations may be allocated between the viewing device 101 and the server 110 in real time based on available resources at each device and changing network conditions (e.g., limited bandwidth).

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8-11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
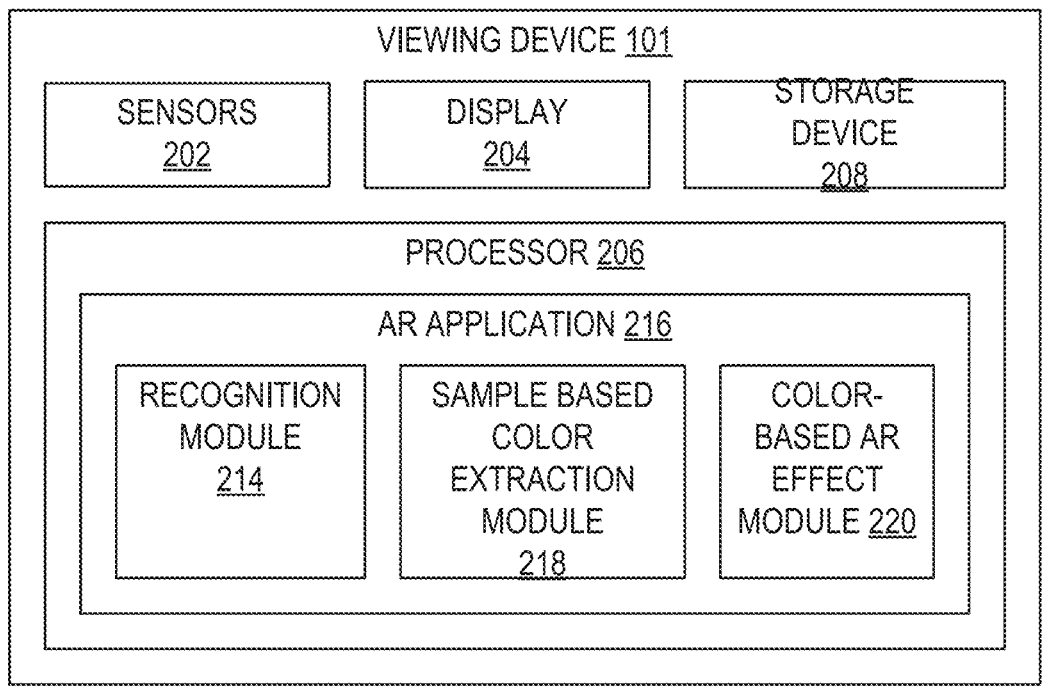
FIG. 2 is a block diagram illustrating an example embodiment of modules (e.g., components) of a viewing device.

FIG. 2 is a block diagram illustrating modules (e.g., components) of the viewing device 101, according to some example embodiments. The viewing device 101 may include sensors 202, a display 204, a processor 206, and a storage device 208. For example, the viewing device 101 may be a wearable computing device (e.g., glasses or a helmet), a desktop computer, a vehicle computer, a tablet computer, a navigational device, a portable media device, or a smart phone of a user. The user may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor (e.g., a camera), an orientation sensor (e.g., a gyroscope), an audio sensor (e.g., a microphone), or any suitable combination thereof. For example, the sensors 202 may include a rear-facing camera and a front-facing camera in the viewing device 101. It is noted that the sensors 202 described herein are for illustration purposes; the sensors 202 are thus not limited to the ones described. The sensors 202 may be used to generate internal tracking data of the viewing device 101 to determine what the viewing device 101 is capturing or looking at in the real physical world.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., a Head-Up Display).

The processor 206 may include an AR application 216 for capturing an image of a real world physical object (e.g., object A 116) and for generating a display of a virtual object in the display 204 of the viewing device 101 corresponding to a color of the captured image of the object A 116. In one example embodiment, the AR application 216 may include a recognition module 214, a sample-based color extraction module 218, and a color-based AR effect module 220.

The recognition module 214 identifies the object that the viewing device 101 is pointed to. The recognition module 214 may detect, generate, and identify identifiers such as feature points of the physical object being viewed or pointed at by the viewing device 101 using an optical device of the viewing device 101 to capture the image of the physical object. As such, the recognition module 214 may be configured to identify one or more physical objects. The identification of the object may be performed in many different ways. For example, the recognition module 214 may determine feature points of the object based on several image frames of the object. The recognition module 214 also determines the identity of the object using any visual recognition algorithm. In another example, a unique identifier may be associated with the object. The unique identifier may be a unique wireless signal or a unique visual pattern such that the recognition module 214 can look up the identity of the object based on the unique identifier from a local or remote content database. In another example embodiment, the recognition module 214 includes a facial recognition algorithm to determine an identity of a subject or an object.

Furthermore, the recognition module 214 may be configured to determine whether the captured image matches an image locally stored in a local database of images and corresponding additional information (e.g., three-dimensional model and interactive features) on the viewing device 101. In one embodiment, the recognition module 214 retrieves a primary content dataset from the server 110, and generates and updates a contextual content dataset based on an image captured with the viewing device 101.

Figure 3:
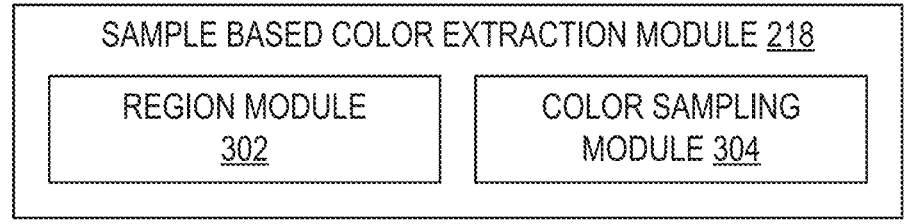
FIG. 3 is a block diagram illustrating an example embodiment of a sample-based color extraction module.

The sample-based color extraction module 218 captures an image of a real world object with the optical sensor, and divides or breaks down the captured image into multiple regions. The sample-based color extraction module 218 then identifies a color value for each region. As such, instead of determining the color value of every pixel in a captured image, the sample-based color extraction module 218 extracts color values of sample pixels from a region to assign a color value to the corresponding region. In one example embodiment, the sample-based color extraction module 218 includes a region module 302 and a color sampling module 304 as illustrated in FIG. 3.

The region module 302 divides the captured image into multiple regions where each region includes sample pixel color values within a predefined threshold. For example, a predefined threshold may include a range of color values within which sample pixel color values fall in the region. As such, the higher the range of color values, the higher the diversity of colors (e.g., light blue to dark blue). Furthermore, the region module 302 may adjust the shape and size of a region based on color value variations within the corresponding region. For example, a user uses crayons to color inside an outline of a dog. The region may be defined as different shades of brown color within the outline of the dog. In another example, the size of the region may be adjusted so that the color variation of color values within the corresponding region falls within the predefined thresholds. For example, the viewing device 101 captures a drawing of a colored brown dog sitting on green grass. The region module 302 divides regions in the drawing according to the green and brown color. Because the color variation between the green color and brown color exceeds the predefined threshold, the region module 302 does not create a region that includes both green and brown color.

In another example, the region module 302 adjusts the shape and size of a region based on color value variations in the surrounding regions. For example, a red round button may stand out against a grey background of a machine. An LED readout of gauge may include different colors different from the surrounding regions (e.g., black frame). As such, the region module 302 adjusts the shape of the region to the size of the red button or the LED readout gauge. The region module 302 may also adjust the shape and size of a region based on the behavior of colors within a region. For example, the size of the region may be adjusted based on the color, the lack of color, the brightness of the color, and the state of the color (e.g., blinking vs non-blinking).

In another example embodiment, the region module 302 increases the size of the region in response to the color value variations exceeding an upper threshold value. Similarly, the region module 302 decreases the size of the region in response to the color value variations falling below a lower threshold value. For example, the region module 302 increases the size of the region around the head of the brown dog to include the entire body of the dog if the dog is entirely brown.

In one example embodiment, the color sampling module 304 computes a median color value for each region. For example, the color sampling module 304 determines a number of color value pixels for a sampled region as defined by the region module 302. A larger region may include a larger number of sampled color value pixels than a smaller region. The number of samples corresponding to a size of a region may be predefined. For example, the number of samples may be a function of the size and shape of a region. The region module 302 may include a table of the number of pixels and corresponding region sizes. The region module 302 then determines the median color value of the sampled pixels in a corresponding region. Other statistical methods may be used to sample and determine a color value of the sampled pixels. The region module 302 then assigns the median color value to the corresponding region.

In another example embodiment, the color sampling module 304 randomly selects a predefined number of sample pixels within a region. The color sampling module 304 computes the median color value based on the sample pixels within the region. The region module 302 then assigns the computed median color value to the corresponding region. As such, the color sampling module 304 reduces the processing requirement on the processor 206 of the viewing device 101 by avoiding computation to extract color values from every pixel in the captured image of the object A 116.

Figure 4:
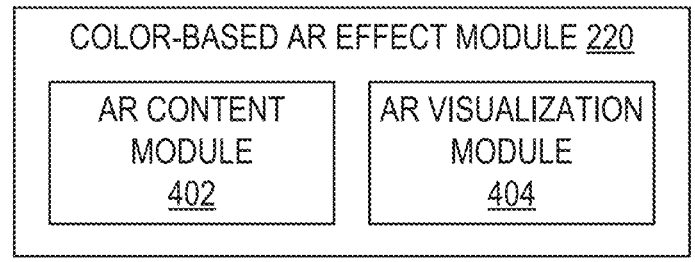
FIG. 4 is a block diagram illustrating an example embodiment of a color-based AR effect module.

Referring back to FIG. 2, the color-based AR effect module 220 retrieves a virtual content based on the computed sample color values of one or more of regions in the capture image and generates an effect or a visualization based on the computed sample color values. For example, the region module 302 determines that the region includes an outline of a drawing of a car on a piece of paper. The color sampling module 304 determines a number of sample pixels to sample within the drawing of the car, extracts the color value of the number of sample pixels in the drawing of the car, and computes a median color value for the drawing of the car. The color-based AR effect module 220 retrieves a virtual three-dimensional model of a car with colors based on the computed sample color values in the drawing of the car. In one example, the color-based AR effect module 220 retrieves a virtual three-dimensional model of a sports car based on red colors in the drawing of the car. In another example, the color-based AR effect module 220 retrieves a virtual three-dimensional model of a police car based on white and black colors in the drawing of the car. As such, the color-based AR effect module 220 retrieves virtual content based on a combination of the recognized object and the color of the recognized object. In one example embodiment, the color-based AR effect module 220 includes an AR content module 402 and an AR visualization module 404 as illustrated in FIG. 4.

The AR content module 402 retrieves a characteristic of the virtual content associated with the color value corresponding to one or more regions. For example, the characteristic includes an effect, an animation, a behavior, or a color of the virtual content. For example, a three-dimensional model of a raining virtual cloud is associated with a grey color of a region defined with an outline of a cloud in a drawing. In another example, a three-dimensional model of a puffy white virtual cloud is associated with a white color of a region defined with an outline of the cloud in the drawing. The AR content module 402 may associate other colors with other characteristics. For example, a red color of a recognized drawing of a cartoon character may be associated with a three-dimensional model of the same cartoon character jumping around or dancing.

In another example, the AR content module 402 identifies green markings on a floor of a factory. The AR content module 402 determines that the green markings correspond to pedestrian traffic in the factory and retrieves a three-dimensional model of arrows visually perceived as floating above the ground to guide the user to walk through the factory along the markings on the floor. The AR content module 402 determines that the orange markings on the floor correspond to machine-operated traffic in the factory and retrieves a three-dimensional model of a warning sign or caution sign visually perceived as floating above the green markings on the ground to guide the user to prevent walking in those areas. As such, different colors may be associated with different behaviors and animations of the corresponding virtual object.

The AR visualization module 404 generates or modifies a visualization of the virtual content in the captured image of the real-world object. For example, the AR visualization module 404 renders a three-dimensional model of the virtual content in the display 204 of the viewing device 101. The user 102 of the viewing device 101 visually perceives the three-dimensional model as an overlay on top of the captured image. For example, the user 102 may visually perceive a virtual dog sitting on top of a dog house. The viewing device 101 may display the three-dimensional model via a transparent or non-transparent display.

In another example embodiment, the AR visualization module 404 renders a visualization of the characteristic of the virtual content in the display 204 of the viewing device 101. For example, the AR visualization module 404 displays a three-dimensional model of a virtual dog associated with a drawing of a dog. The AR visualization module 404 further animates the three-dimensional model of the dog based on the color of the dog in the drawing. In another example, the AR visualization module 404 animates the three-dimensional model of the dog based on the color of a specific area in the drawing of the dog. For example, red paws cause the virtual three-dimensional dog to jump around. In another example, a predefined area in the drawing may be dedicated to the characteristic of the three-dimensional virtual model. The drawing may include a predefined box in a lower corner for the user to color. The color in the predefined box defines the characteristic of the three-dimensional virtual model. In other embodiments, the content and characteristic of the three-dimensional virtual model may be a function of data from sensors 202 of the viewing device 101. For example, if one of the sensors 202 indicates a temperature of 40 degrees Fahrenheit at a specific location in a factory, the AR visualization module 404 generates a visualization of fast moving exit arrows correlated to the green pedestrian markings on the floor of the factory. As such, the nature and characteristics of the virtual content generated or accessed may be a function of a combination of a recognized object, a color of the recognized object, and data from sensors 202 of the viewing device 101.

In one example embodiment, the AR visualization module 404 receives data from the server 110 to render the visualization. In another example embodiment, the AR visualization module 404 receives the rendered object. The AR visualization module 404 further determines the position and size of the rendered object to be displayed in relation to an image of the object. For example, the AR visualization module 404 places a virtual three-dimensional model of an animated heart with the size and position based on the image of the subject such that the animated heart is displayed on the chest area of the subject with the appropriate size. If the subject is wearing a red T shirt, the virtual three-dimensional model of an animated heart may be moving at a faster pace than a subject wearing a darker T shirt. The AR visualization module 404 may track the image of the subject and render the virtual object based on the position of the image of the subject in a display 204 of the viewing device 101.

The viewing device 101 may access from a local memory a visualization model (e.g., vector shapes) corresponding to the image of the object (e.g., bridge). In another example, the viewing device 101 receives a visualization model corresponding to the image of the object from the server 110. The viewing device 101 then renders the visualization model to be displayed in relation to an image of the object being displayed in the viewing device 101 or in relation to a position and orientation of the viewing device 101 relative to the object. The AR application 216 may adjust a position of the rendered visualization model in the display 204 to correspond with the last tracked position of the object.

The AR visualization module 404 may include a local rendering engine that generates a visualization of a three-dimensional virtual object overlaid (e.g., superimposed upon, or otherwise displayed in tandem with) on an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position of the camera of the viewing device 101 relative to the physical object.

In one example embodiment, the AR visualization module 404 may retrieve three-dimensional models of virtual objects associated with a captured image of a real-world object. For example, the captured image may include a visual reference (also referred to as a marker) that consists of an identifiable image, symbol, letter, number, machine-readable code. For example, the visual reference may include a bar code, a quick response (QR) code, a pattern, or an image that has been previously associated with a three-dimensional virtual object (e.g., an image that has been previously determined to correspond to the three-dimensional virtual object).

In one example embodiment, the AR visualization module 404 identifies the physical object (e.g., a physical telephone), accesses virtual functions (e.g., increase or lower the volume of a nearby television) associated with physical manipulations (e.g., lifting a physical telephone handset) of the physical object, and generates a virtual function corresponding to a physical manipulation of the physical object.

The storage device 208 may be configured to store a database of identifiers of physical objects, tracking data, and corresponding virtual objects having colors and characteristics a function of a color of a recognized physical object. In another embodiment, the database may also include visual references (e.g., images) and corresponding experiences (e.g., three-dimensional virtual objects, interactive features of the three-dimensional virtual objects, animations of the three-dimensional virtual objects, characteristics of the three-dimensional virtual objects). For example, the visual reference may include a machine-readable code or a previously identified image (e.g., a picture of a superhero character). The previously identified image of the superhero character may correspond to a three-dimensional virtual model of the superhero character that can be viewed from different angles by manipulating the position of the viewing device 101 relative to the picture of the shoe. Features or powers of the three-dimensional virtual superhero character may be displayed based on the detected sample color values of a real-world object.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular drawings or cartoons and their corresponding experiences (e.g., virtual objects that represent the ten most drawings or cartoons). In another example, the server 110 may generate the first set of images based on the most popular or often scanned images received at the server 110. Thus, the primary content dataset does not depend on objects or images scanned by the recognition module 214 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the recognition module 214 of the viewing device 101.

In one embodiment, the viewing device 101 may communicate over the network 108 with the server 110 to retrieve a portion of a database of visual references, corresponding three-dimensional virtual objects, and corresponding features of the three-dimensional virtual objects. The network 108 may be any network that enables communication between or among machines, databases, and devices (e.g., the viewing device 101).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
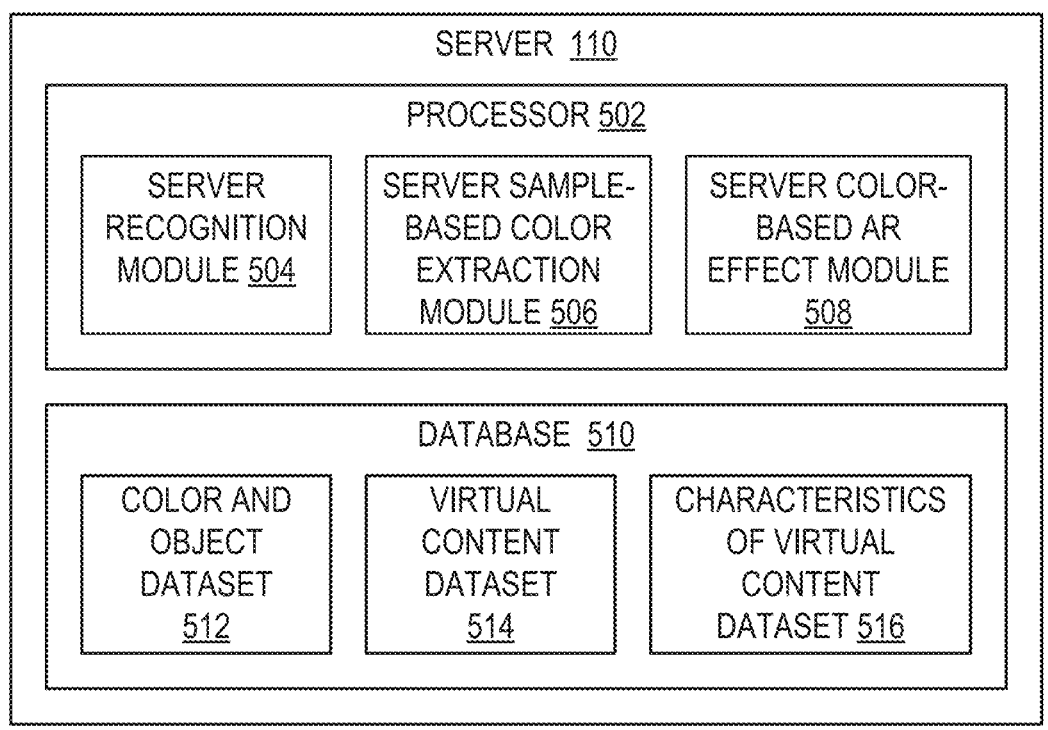
FIG. 5 is a block diagram illustrating an example embodiment of modules of a server.

FIG. 5 is a block diagram illustrating modules (e.g., components) of the server 110. The server 110 includes a processor 502 and a database 510. The processor 502 includes a server recognition module 504, a server sample-based color extraction module 506, and a server color-based AR effect module 508. The server recognition module 504 operates in a similar way to the recognition module 214 of the viewing device 101. For example, the server recognition module 504 identifies the object A 116 based on a captured image received from the viewing device 101. In another example, the viewing device 101 already has identified the object A 116 and provides the identification information to the server recognition module 504.

The server sample-based color extraction module 506 also operates in a similar way as the sample-based color extraction module 218 of the viewing device 101. For example, the server sample-based color extraction module 506 divides or breaks down the received image from the viewing device 101 into multiple regions. The sample-based color extraction module 218 then identifies a color value for each region. As such, instead of determining the color value of every pixel in a captured image, the sample-based color extraction module 218 extracts color values of sample pixels from a region to assign a color value to the corresponding region.

The server color-based AR effect module 508 also operates in a similar way as the color-based AR effect module 220. For example, the server color-based AR effect module 508 retrieves a virtual content based on the computed sample color values of one or more of regions in the received image from the viewing device 101 and generates an AR effect based on the computed sample color values.

The database 510 may store a color and object dataset 512, a virtual content dataset 514, and characteristics of virtual content dataset 516. The color and object dataset 512 may store a primary content dataset and a contextual content dataset. The primary content dataset comprises a first set of images, colors, and corresponding virtual object models. The server recognition module 504 determines that a color and/or a captured image received from the viewing device 101 is not recognized in the color and object dataset 512, and generates the contextual content dataset for the viewing device 101. The contextual content dataset may include a second set of colors and images and corresponding virtual object models. The virtual content dataset 514 includes models of virtual objects (e.g., a three-dimensional model of an object) to be generated upon receiving a notification associated with an image of a corresponding physical object. The characteristics of virtual content dataset 516 include a table of identified objects and/or colors with characteristics or behaviors (e.g., animation, effects, sound, music, etc.) that correspond to the sample color values from the captured image.

Figure 6:
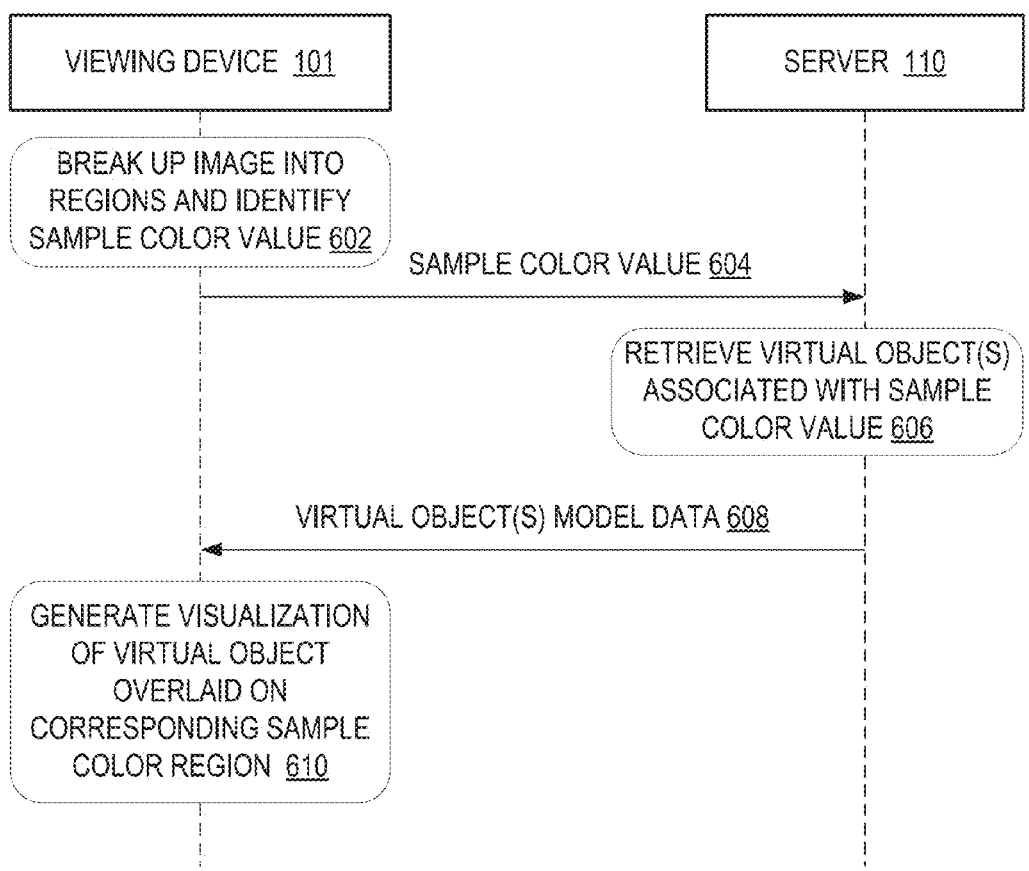
FIG. 6 is an interaction diagram illustrating an example embodiment of interactions between a viewing device and a server.

FIG. 6 is an interaction diagram illustrating an example embodiment of a system for sample-based color extraction in an AR application of the viewing device 101 and the server 110. At operation 602, the viewing device 101 captures a picture of the object A 116 in a physical environment 114. The viewing device 101 optionally tracks data related to the objects being captured by the viewing device 101. For example, sensors 202 may be used in tracking a temperature or location of the object A 116. The viewing device 101 breaks up the picture of the object A 116 into regions and identifies sample color values from the regions. In one example embodiment, operation 602 may be implemented using the recognition module 214, the sample-based color extraction module 218, and the color-based AR effect module 220.

At operation 604, the viewing device 101 communicates the sample color value for one or more regions to the server 110. At operation 606, the server 110 retrieves a model of a virtual object associated with the sample color values received from the viewing device 101. In one example embodiment, operation 606 may be implemented using the server color-based AR effect module 508 of FIG. 5.

At operation 608, the server 110 communicates the virtual object model data back to the viewing device 101. At operation 610, the viewing device 101 generates a visualization of the virtual object overlaid on corresponding sample color regions. In one example embodiment, operation 610 may be implemented using the AR visualization module 406 of FIG. 4.

Figure 7:
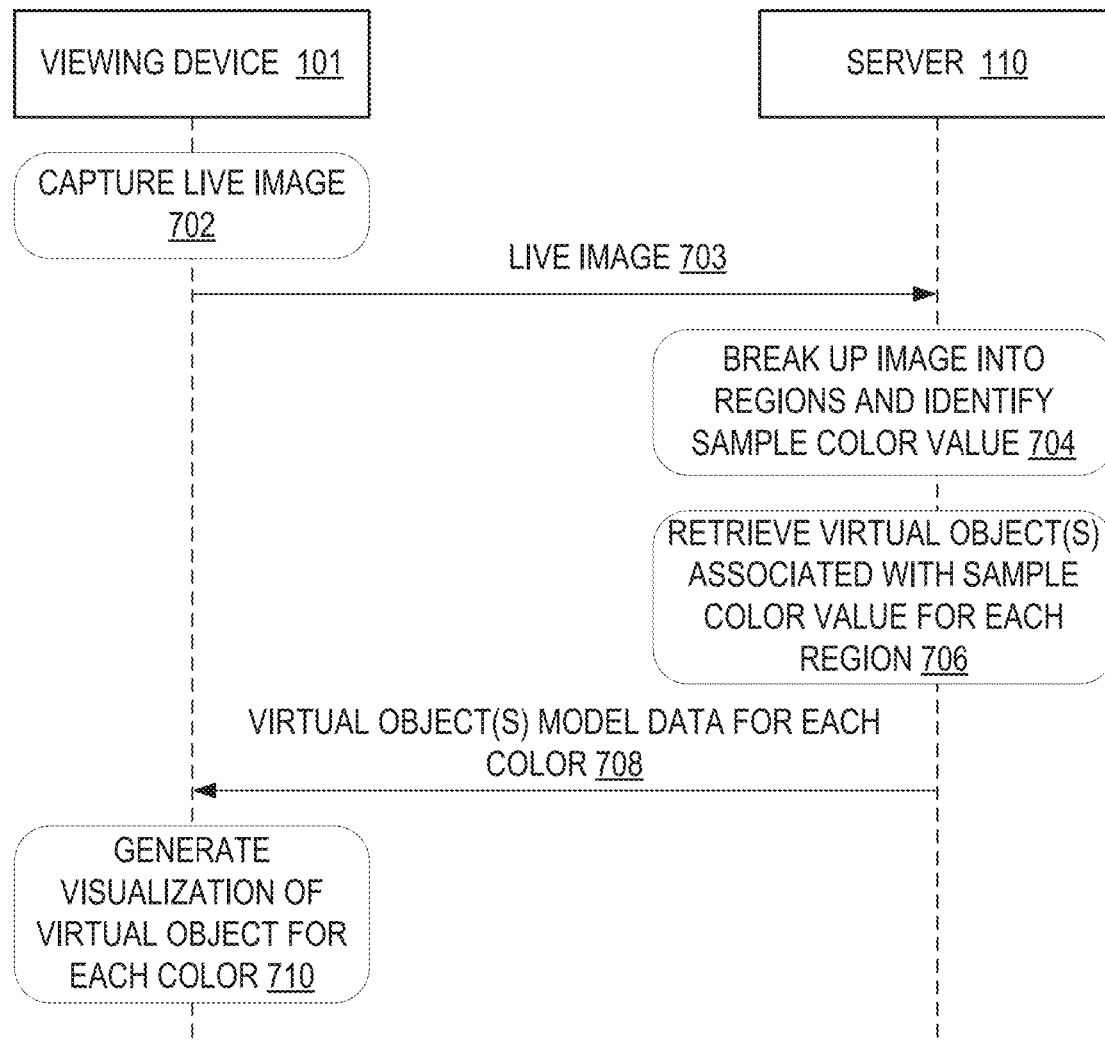
FIG. 7 is an interaction diagram illustrating another example embodiment of interactions between a viewing device and a server.

FIG. 7 is an interaction diagram illustrating another example embodiment of a system for sample-based color extraction in an AR application of the viewing device 101 and the server 110. At operation 702, the viewing device 101 captures a live image of the object A 116 in a physical environment 114. At operation 703, the viewing device 101 sends the live image of the object A 116 to the server 110 for processing. At operation 704, the server 110 breaks up the live picture of the object A 116 into regions and identifies sample color values from the regions using, for example, the server sample-based color extraction module 506 of FIG. 5.

At operation 706, the server 110 retrieves a model of a virtual object associated with the sample color values previously determined at operation 704. In one example embodiment, operation 706 may be implemented using the server color-based AR effect module 508 of FIG. 5.

At operation 708, the server 110 communicates the virtual object model data for one or more regions back to the viewing device 101. At operation 710, the viewing device 101 generates a visualization of the virtual object overlaid on corresponding sample color regions. In one example embodiment, operation 710 may be implemented using the AR visualization module 406 of FIG. 4.

Figure 8:
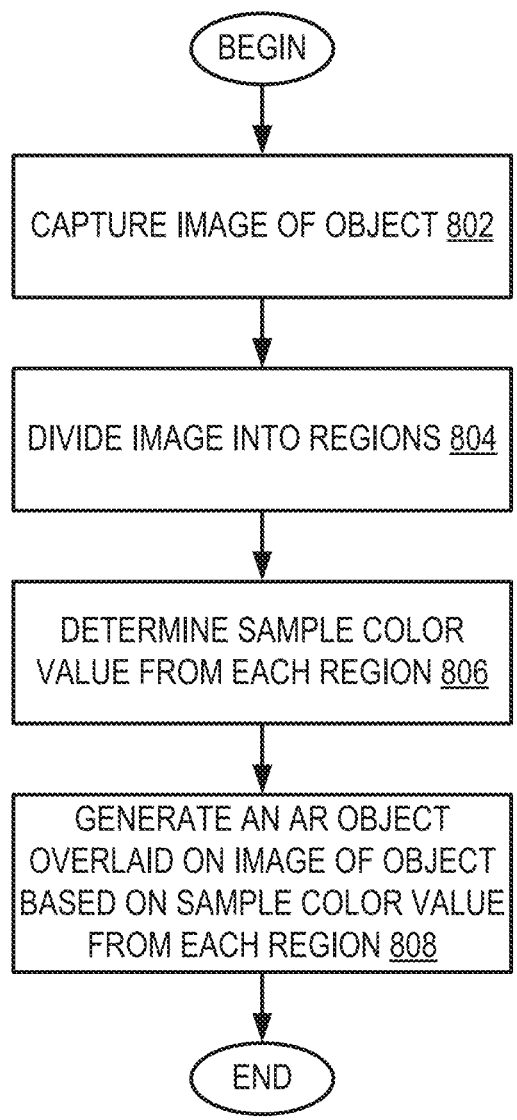
FIG. 8 is a flowchart of a method illustrating an example embodiment of an operation for sample-based color extraction in an augmented reality application.

FIG. 8 is a flowchart of a method illustrating an example operation of sample-based color extraction for an AR system. At operation 802, the viewing device 101 captures an image of an object.

At operation 804, the viewing device 101 divides the image into one or more regions based on the color variations for each region. In one example embodiment, operation 804 may be implemented using the sample-based color extraction module 218 of FIG. 2.

The viewing device 101 may determine a sample color value from each region (see operation 806). In one example embodiment, operation 806 may be implemented using the sample-based color extraction module 218 of FIG. 2.

Thereafter, as shown at operation 808, the viewing device 101 generates a model of an AR object overlaid on an image of the object based on a sample color value from each region. In one example embodiment, operation 808 may be implemented using the color-based AR effect module 220 of FIG. 2.

Figure 9:
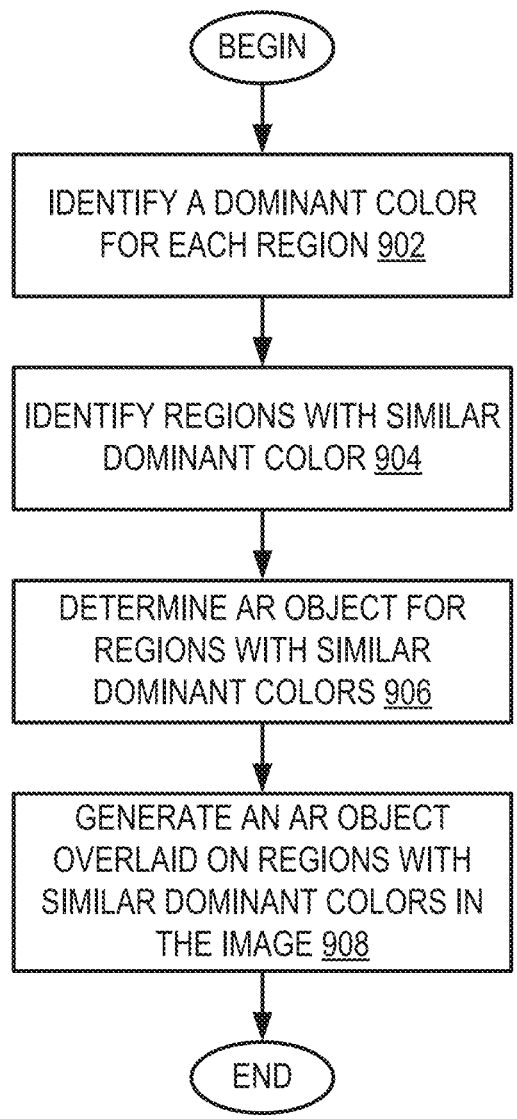
FIG. 9 is a flowchart of a method illustrating another example embodiment of an operation for sample-based color extraction in an augmented reality application.

FIG. 9 is a flowchart of a method illustrating an example operation of sample-based color extraction for an AR system. At operation 902, the viewing device 101 identifies a dominant color for each region of a captured image. A dominant color may be determined based on the number of pixels of the same color exceeding the number of pixels of different colors. In one example embodiment, operation 902 may be implemented using the region module 302 of FIG. 3.

At operation 904, the viewing device 101 identifies regions with similar dominant colors. In one example embodiment, operation 902 may be implemented using the region module 302 of FIG. 3.

As shown at operation 906, the viewing device 101 determines a model of an AR object for the regions with similar dominant colors. In one example embodiment, operation 906 may be implemented using the AR content module 402 of FIG. 4.

At operation 908, the viewing device 101 generates an AR object overlaid on regions with similar dominant colors in the captured image. In one example embodiment, operation 908 may be implemented using the AR visualization module 404 of FIG. 2.

Figure 10:
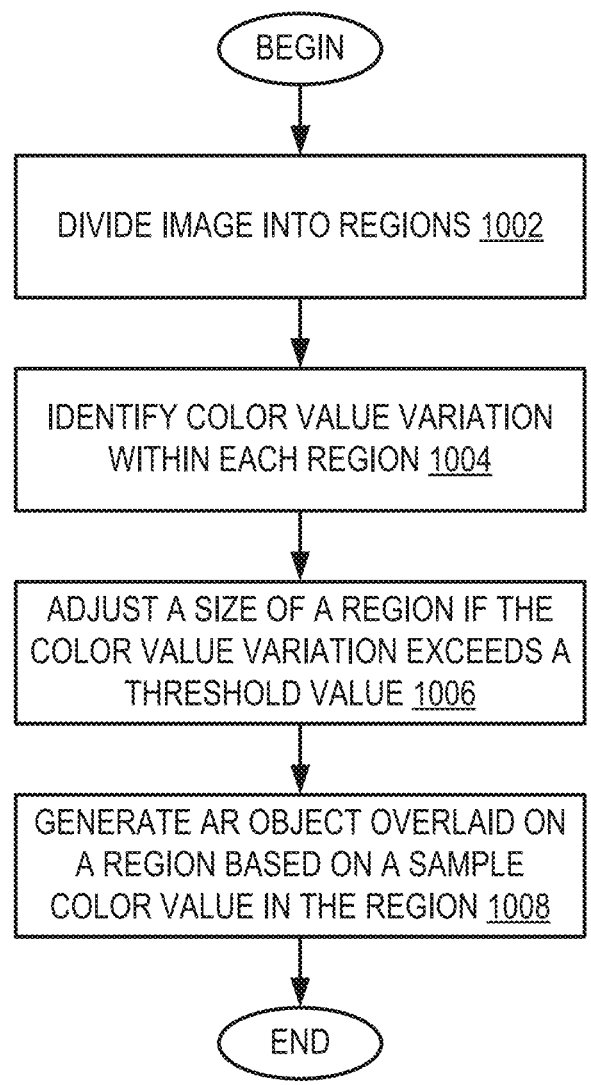
FIG. 10 is a flowchart of a method illustrating another example embodiment of an operation for sample-based color extraction in an augmented reality application.

FIG. 10 is a flowchart of a method illustrating an example operation of sample-based color extraction for an AR system. At operation 1002, the viewing device 101 divides an image into regions. At operation 1004, the viewing device 101 identifies color value variations within each region. At operation 1006, the viewing device 101 adjusts the size of a region if the color value variation exceeds a threshold value. In one example embodiment, operation 1006 may be implemented using the region module 302 of FIG. 3.

At operation 1008, the viewing device 101 generates an AR object overlaid on regions with the corresponding regions in the captured image. In one example embodiment, operation 1008 may be implemented using the AR visualization module 404 of FIG. 2.

Figure 11:
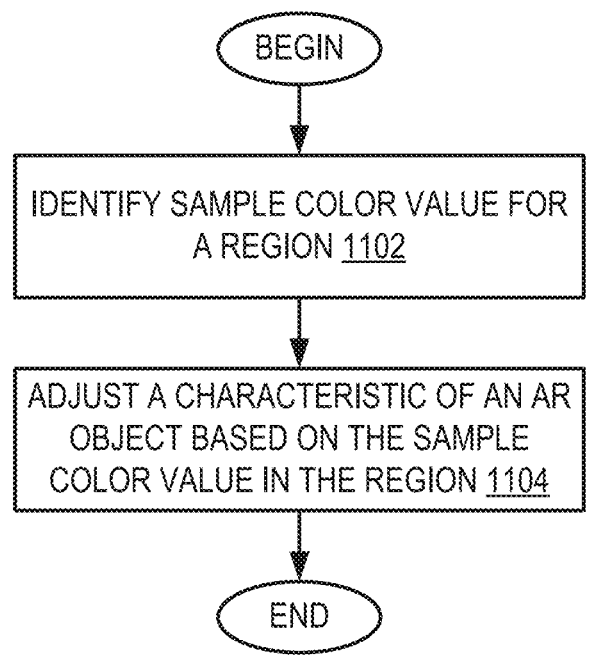
FIG. 11 is a flowchart of a method illustrating another example embodiment of an operation for sample-based color extraction in an augmented reality application.

FIG. 11 is a flowchart of a method illustrating an example operation of sample-based color extraction for an AR system. At operation 1102, the viewing device 101 identifies a sample color value for a region. At operation 1104, the viewing device 101 adjusts a characteristic of an AR object based on the sample color value in the region. In one example embodiment, operation 1104 may be implemented using the region module 302 of FIG. 3.

Figure 12:
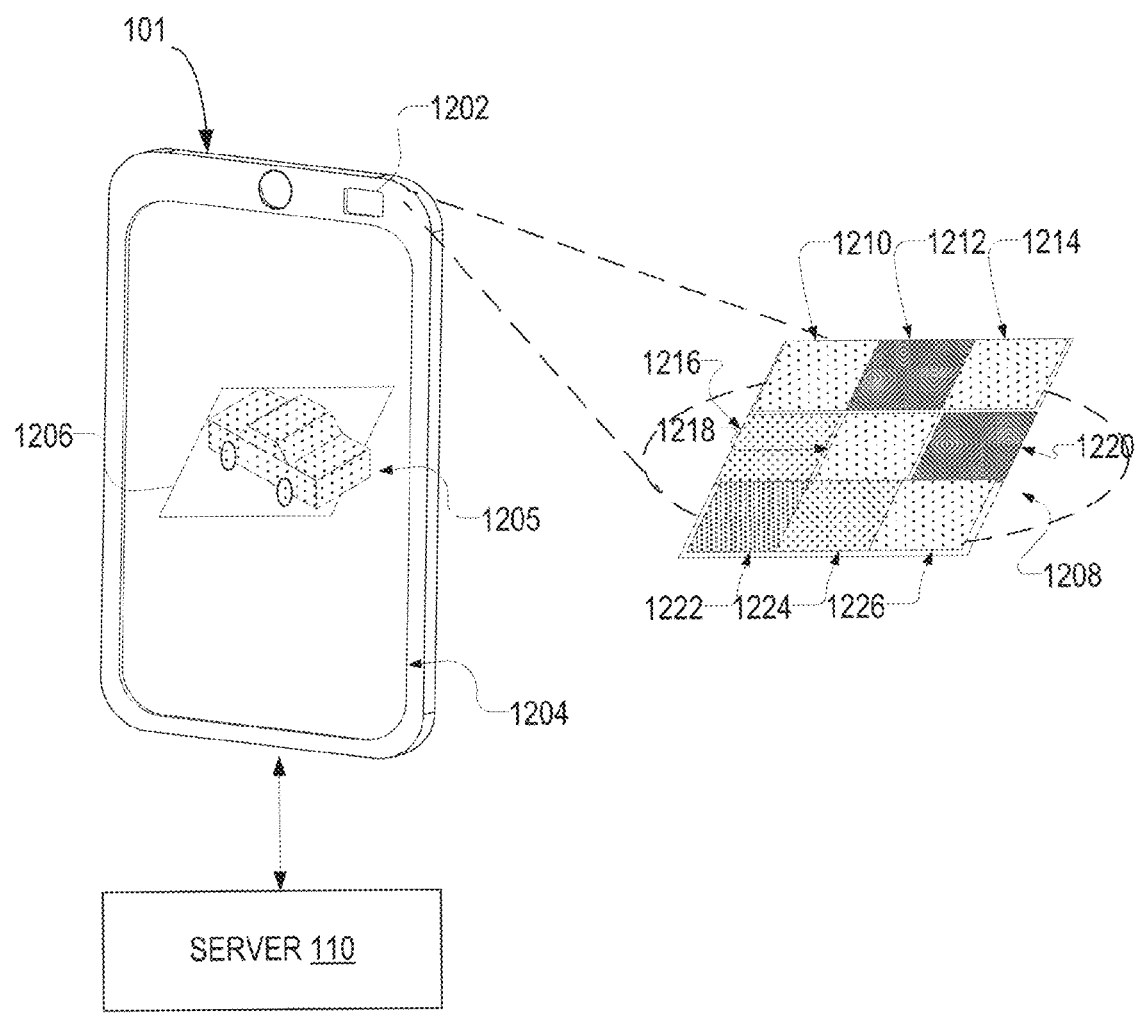
FIG. 12 is a diagram illustrating an example operation of sample-based color extraction in an augmented reality application.

FIG. 12 is a diagram illustrating an example operation of sample-based color extraction for an AR system. The viewing device 101 includes a handheld mobile device having a rear view camera 1202 and a touch sensitive display 1204. The viewing device 101 may be pointed at a real-world scene comprising a colored drawing on a paper 1208. The rear view camera 1202 captures an image of the paper 1208 and displays a picture 1206 of the paper 1208 in the display 1204. Optionally, identifiers (e.g., QR code, or specific patterns) and tracking data related to the paper 1208 may be recognized by the viewing device 101 based on the picture 1206 so as to identify the drawing on the paper 1208. For example, markings on the paper 1208 are associated with a three-dimensional model of a virtual car 1205.

In one example embodiment, the viewing device 101 divides the picture 1206 of the paper 1208 into regions 1210, 1212, 1214, 1216, 1218, 1220, 1222, 1224, and 1226. The viewing device 101 identifies a sample color value for each region 1210-1226 and determines the dominant color from all regions 1210-1226 using the sample-based color extraction module 218. The viewing device 101 then adjusts a color or another characteristic of the virtual car 1205 based on the dominant color from the regions 1210-1226 on the paper 1208.

In another example embodiment, the viewing device 101 communicates an identification of the identified paper 1208 to the server 110. The server 110 retrieves or generates a three-dimensional model of a virtual object associated with the paper 1208. The server 110 divides the image of the paper 1208 into regions 1210-1226 and extracts sample color values from each region 1210-1226. The server 110 then adjusts a color or a behavior of the three-dimensional model based on the extracted color values from the corresponding regions 1210-1226. The server 110 then communicates the colored three-dimensional model back to the viewing device 101. The viewing device 101 generates a visualization of the colored three-dimensional model of a virtual object. For example, the visualization may include the virtual car 1205 with the color extracted from a region of the paper 1208.

Figure 13A:
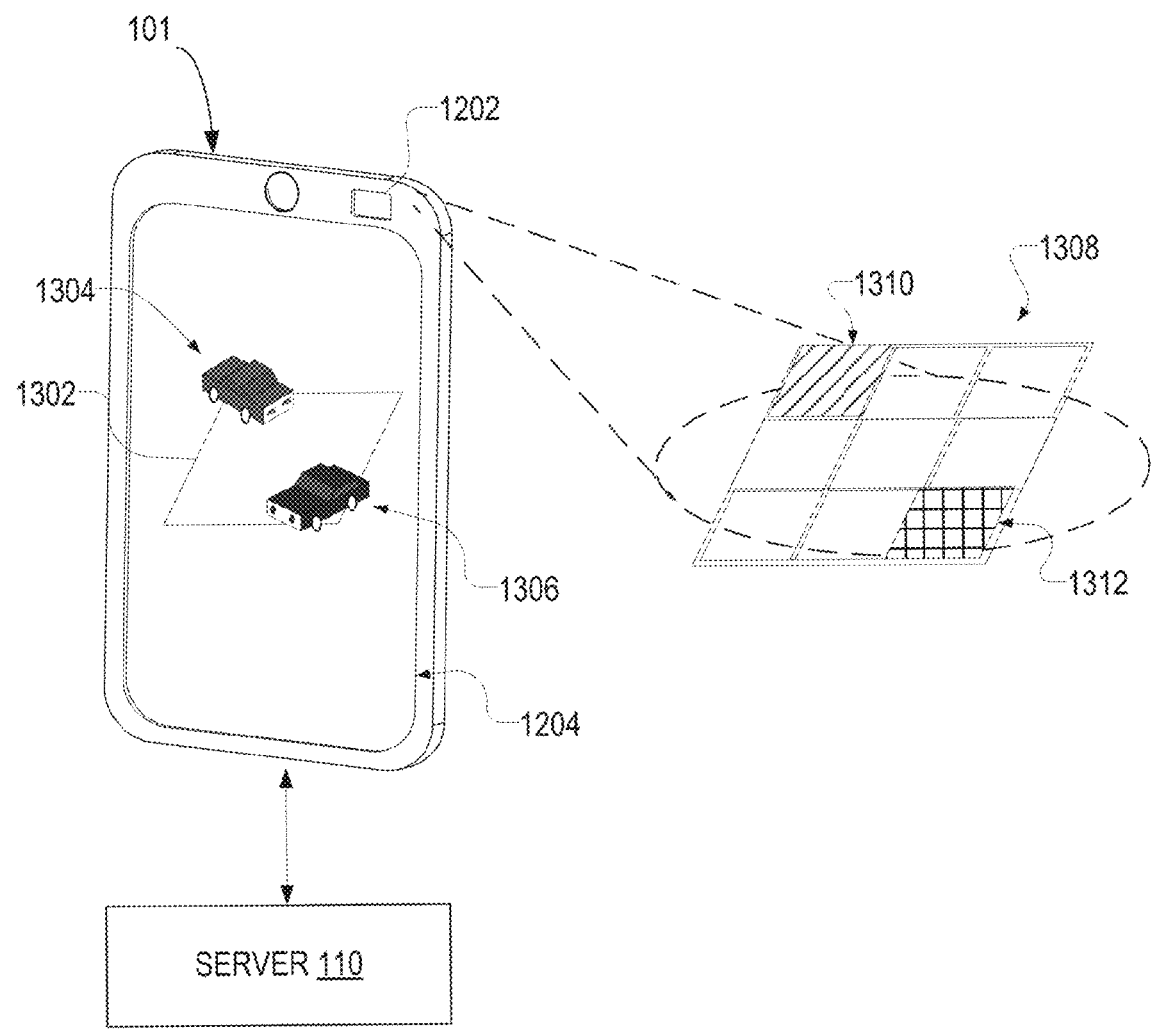
FIG. 13A is a diagram illustrating an example operation of sample-based color extraction in an augmented reality application.

FIG. 13A is a diagram illustrating an example operation of sample-based color extraction for an AR system. The viewing device 101 may be pointed at a colored drawing on a paper 1308. The rear view camera 1202 captures an image of the paper 1308 and displays an image 1302 of the paper 1308 in the display 1204.

In one example embodiment, the viewing device 101 identifies a sample color value for each region using the sample-based color extraction module 218. For example, the viewing device 101 determines the sample color value for region 1310 and applies the sample color value to the virtual car 1304. Similarly, the viewing device 101 determines the sample color value for region 1312 and applies the sample color value to the virtual car 1306.

The viewing device 101 generates a visualization of the colored three-dimensional model of the virtual car 1304 at a location in the image 1302 of the paper 1308 corresponding to the region 1310. Similarly, the viewing device 101 generates a visualization of the colored three-dimensional model of the virtual car 1306 at a location in the image 1302 of the paper 1308 corresponding to the region 1312.

Figure 13B:
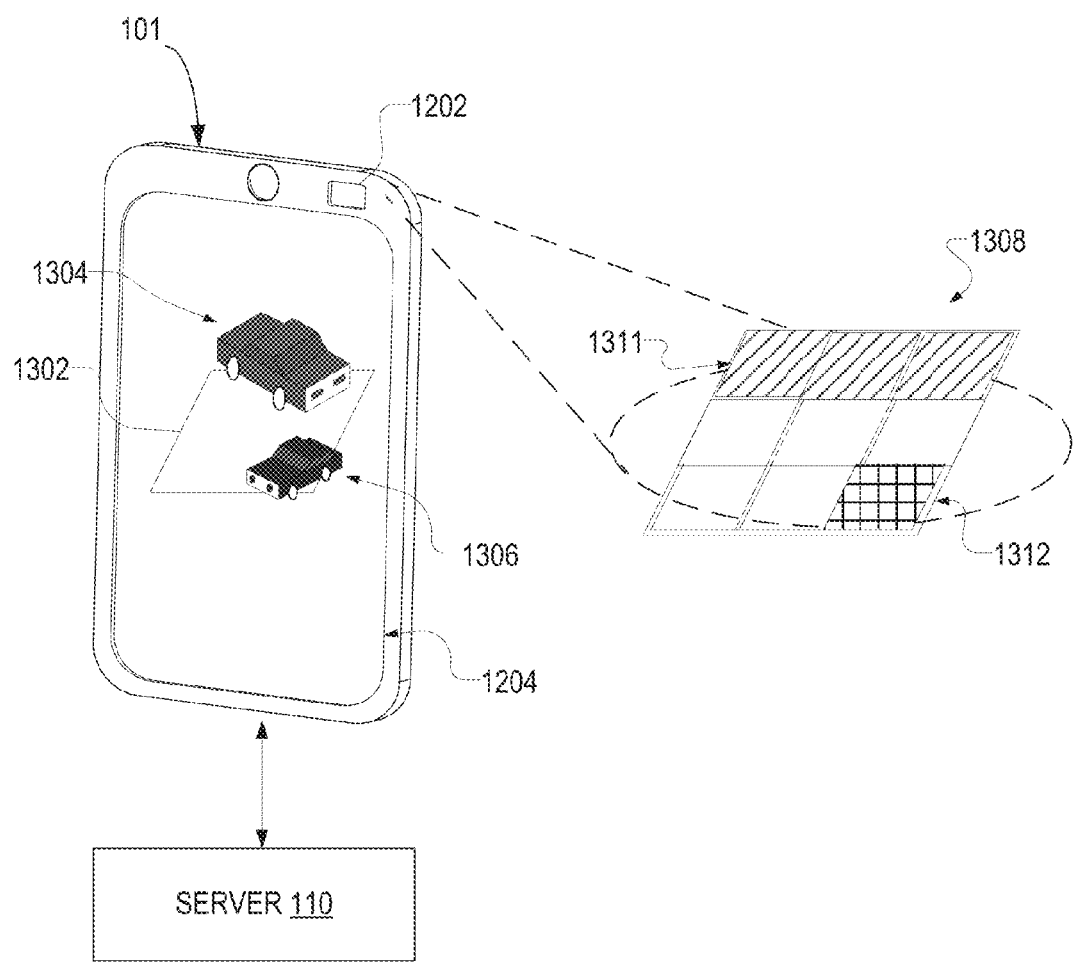
FIG. 13B is a diagram illustrating another example operation of sample-based color extraction in an augmented reality application.

FIG. 13B is a diagram illustrating an example operation of sample-based color extraction for an AR system. The viewing device 101 determines the sample color value for a larger region 1311 (i.e., larger than region 1310) and applies the sample color value to the virtual car 1304. Similarly, the viewing device 101 determines the sample color value for region 1312 and applies the sample color value to the virtual car 1306.

However, the region 1311 is larger than region 1310 with the same color value, the viewing device 101 generates a visualization of the colored virtual car 1304 to be larger to correspond with the larger region 1311. The viewing device 101 generates a visualization of the colored three-dimensional model of the virtual car 1304 at a location in the image 1302 of the paper 1308 corresponding to the region 1311. The viewing device 101 generates a visualization of the colored three-dimensional model of the virtual car 1306 with a relative size corresponding to the size of the region 1312.

Figure 13C:
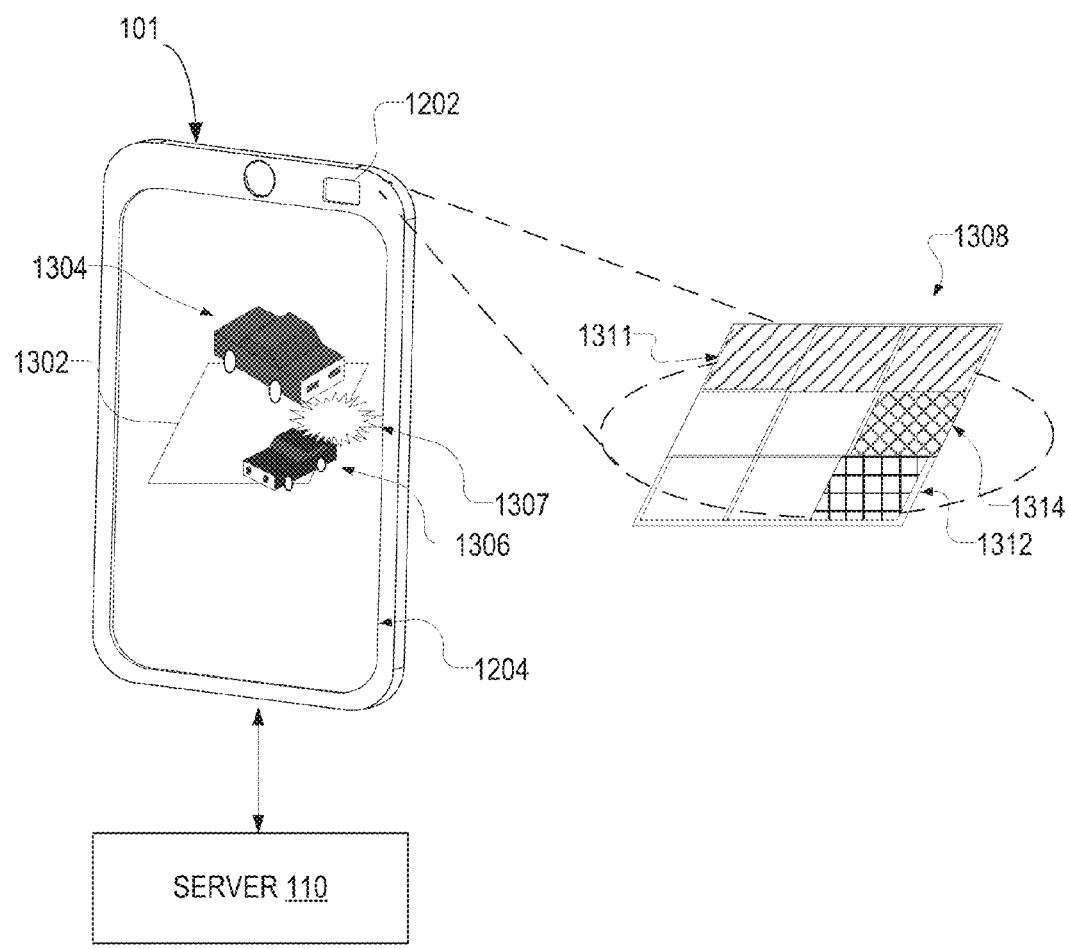
FIG. 13C is a diagram illustrating another example operation of sample-based color extraction in an augmented reality application.

FIG. 13C is a diagram illustrating an example operation of sample-based color extraction for an AR system. The viewing device 101 determines the sample color value for a region 1314 adjacent to the larger region 1311 and region 1312. The viewing device 101 determines that the sample color value corresponds to a special effect (e.g., an explosion). As such, the viewing device 101 generates an animation of the virtual car 1304 colliding with the virtual car 1306 with an explosion animation 1307 at the location corresponding to the region 1314 in the image 1302.

Figure 14:
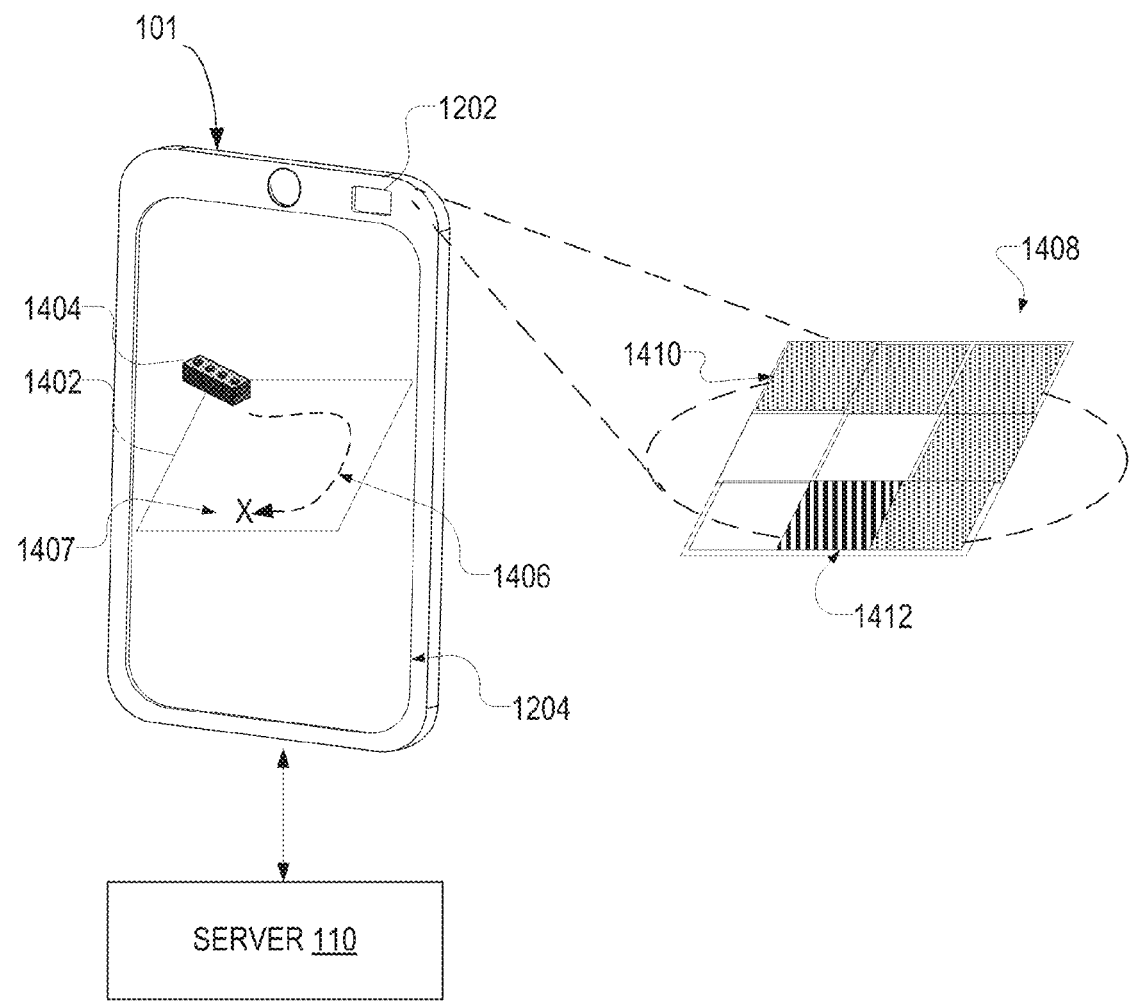
FIG. 14 is a diagram illustrating another example operation of sample-based color extraction in an augmented reality application.

FIG. 14 is a diagram illustrating an example operation of sample-based color extraction for an AR system. The viewing device 101 determines that the sample color value is the same for region 1410 from paper 1408. The viewing device 101 determines that the sample color value in region 1410 corresponds to a moving train, and the sample color value in region 1412 corresponds to a train stop. As such, the viewing device 101 generates an animation of a virtual train 1404 moving along a track 1406 defined by the path and size of region 1410. The virtual train 1404 stops at a location 1407 corresponding to the relative location of the region 1412 on the paper 1408.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
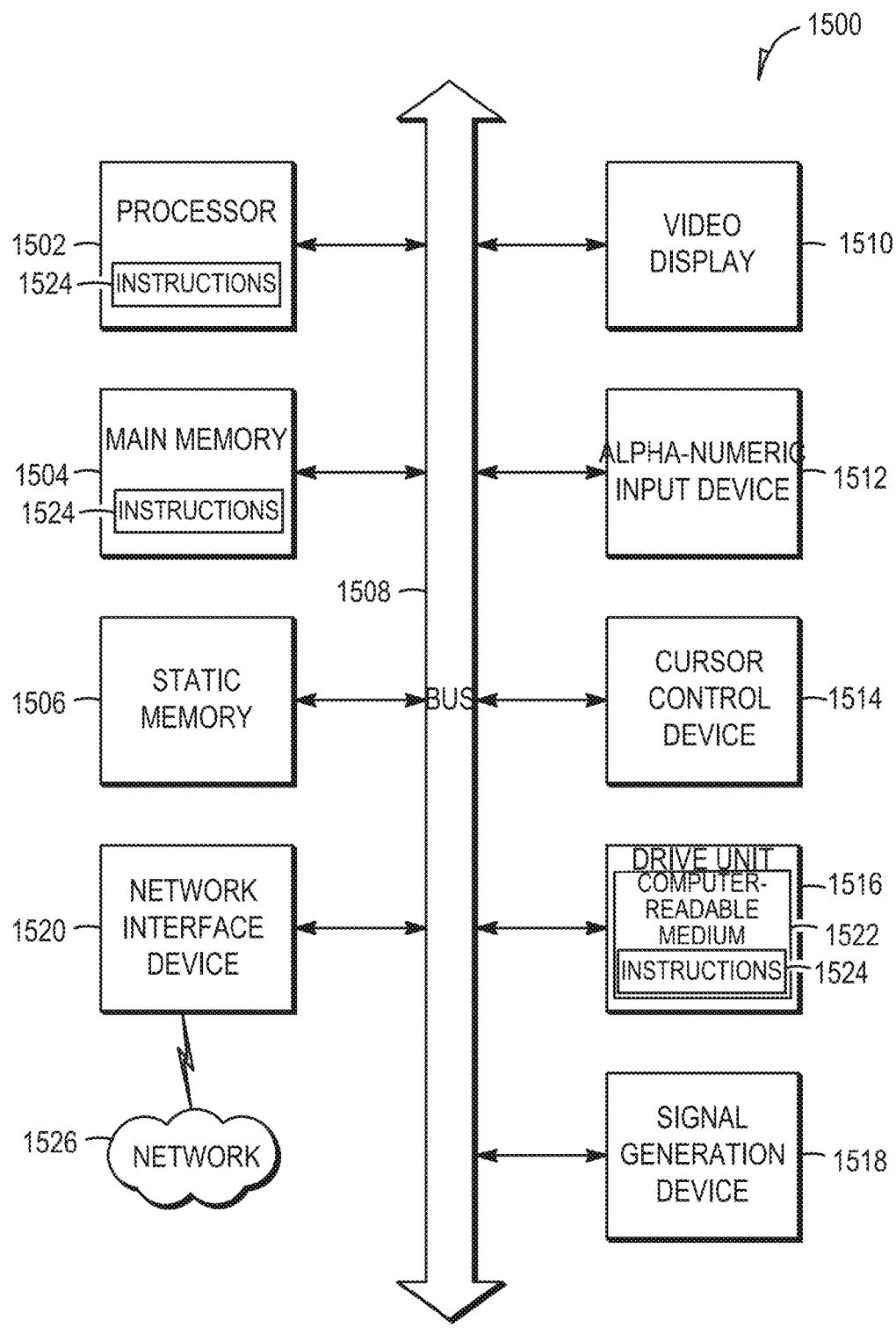
FIG. 15 is a block diagram illustrating components of a machine, according to some example embodiments, able to read instructions from a machine-readable medium and perform any one or more of the methodologies discussed herein.

FIG. 15 is a block diagram of a machine in the example form of a computer system 1500 within which instructions 1524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a disk drive unit 1516, a signal generation device 1518 (e.g., a speaker) and a network interface device 1520.

Machine-Readable Medium

The disk drive unit 1516 includes a computer-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., instructions 1524) for execution by the machine, and includes digital or analog communications signals or other intangible media to facilitate communication of such software.

Example Mobile Device

Figure 16:
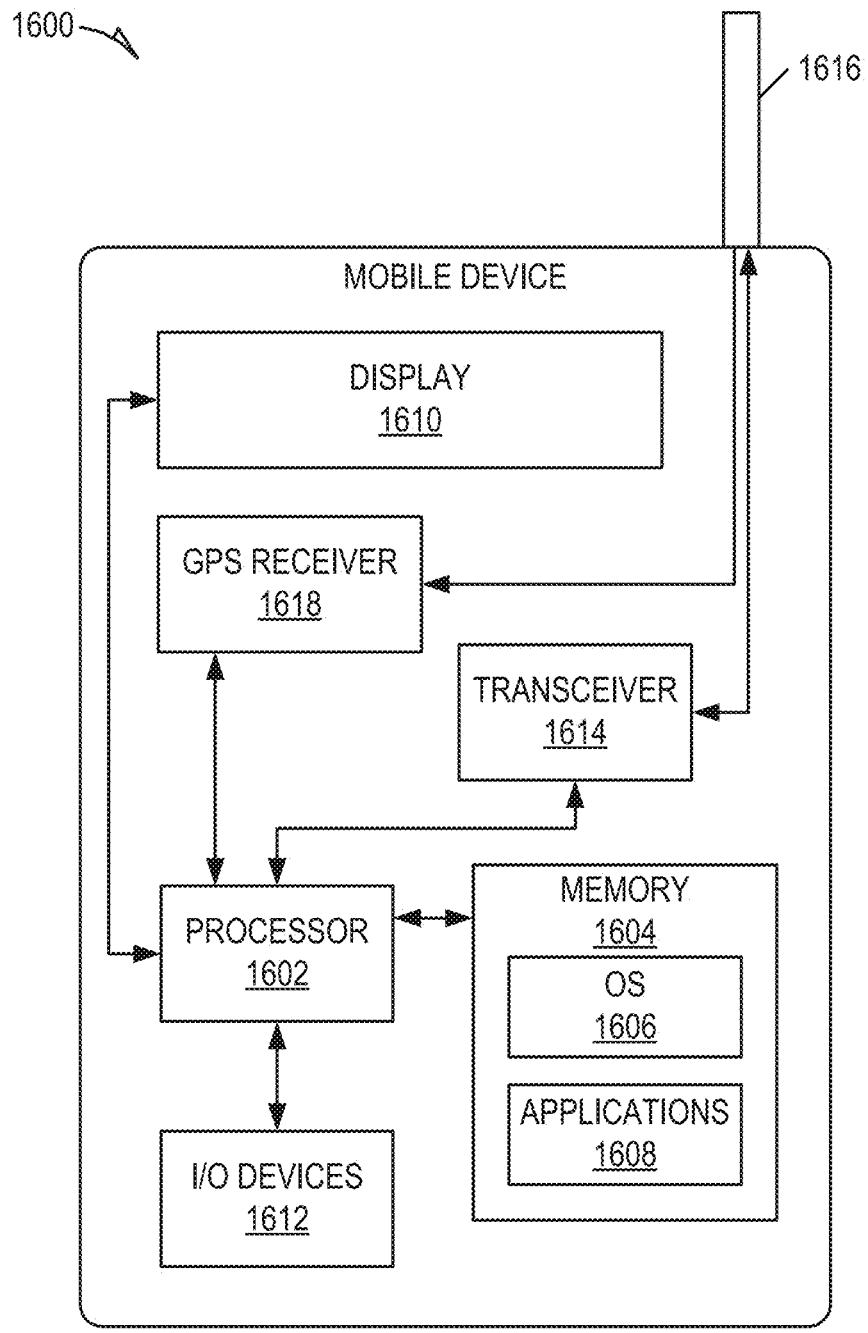
FIG. 16 is a block diagram illustrating a mobile device, according to an example embodiment, able to read instructions from a machine-readable medium and perform any one or more of the methodologies discussed herein.

FIG. 16 is a block diagram illustrating a mobile device 1600, according to an example embodiment. The mobile device 1600 may include a processor 1602. The processor 1602 may be any of a variety of different types of commercially available processors 1602 suitable for mobile devices 1600 (for example, an XScale architecture microprocessor, a microprocessor without interlocked pipeline stages (MIPS) architecture processor, or another type of processor 1602). A memory 1604, such as a random access memory (RAM), a flash memory, or other type of memory, is typically accessible to the processor 1602. The memory 1604 may be adapted to store an operating system (OS) 1606, as well as application programs 1608, such as the AR application 216. The processor 1602 may be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 may be coupled to a transceiver 1614 that interfaces with an antenna 1616. The transceiver 1614 may be configured to both transmit and receive cellular network signals, wireless data signals, or other types of signals via the antenna 1616, depending on the nature of the mobile device 1600. Further, in some configurations, a GPS receiver 1618 may also make use of the antenna 1616 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   capturing, by an optical sensor of a viewing device, an image of a real-world object, yielding image data;
   identifying, based on the image data, the real-world object depicted in the image;
   processing the image data using a processor of the viewing device to divide the captured image of the real-world object into at least a first region and a second region;
   identifying a color value for the first region and a color value for the second region;
   identifying a color value variation for the first region;
   determining that the color value variation for the first region is greater than an upper threshold for a desired color value variation range;
   in response to determining that the color value variation for the first region is greater than the upper threshold, increasing a size of the first region;
   retrieving virtual content data based on an identification of the real-world object, the color value for the first region, and the color value for the second; and
   generating a visualization of virtual content from the virtual content data in a display of the viewing device, the virtual content including colors indicated by the color value for the first region and the color value for the second region.

2. The method of claim 1, further comprising:
   identifying regions in the captured image having sample pixel color values within a predefined threshold; and
   dividing the captured image into a plurality of regions based on the identified regions.

3. The method of claim 2, further comprising:
   identifying a color value variation for the second region;
   determining that the color value variation for the second region is less than an lower threshold for the desired color value variation range; and
   in response to determining that the color value variation for the second region is less than the lower threshold, decreasing a size of the second region.

4. The method of claim 1, further comprising:
   computing a median color value for the first region.

5. The method of claim 4, wherein computing the median color value for the first region comprises:
   selecting sample pixels from within the first region; and
   computing the median color value based on the sample pixels from within the first region.

6. The method of claim 1, wherein
   the virtual content is a three-dimensional model that when virtualized in the display of the viewing device is visually perceived as an overlay on top of the captured image.

7. The method of claim 6, further comprising:
   retrieving a characteristic of the virtual content; and
   rendering a visualization of the characteristic of the virtual content in the display of the viewing device.

8. The method of claim 7, wherein the characteristic includes an animation or a color of the virtual content, a first animation of the virtual object associated with a first color value, a second animation of the virtual object associated with a second color value, a first color of the virtual object associated with the first color value a second color of the virtual object associated with the second color value.

9. The method of claim 1,
   wherein the visualization of the virtual content is visually perceived as an overlay to the real-world object through the display of the viewing device, the display being a transparent display.

10. A non-transitory machine-readable medium comprising instructions that, when executed by one or more computer processors of a viewing device, cause the viewing device to perform operations comprising:
    capturing, by an optical sensor of the viewing device, an image of a real-world object, yielding image data;
    identifying, based on the image data, the real-world object depicted in the image;
    processing the image data to divide the captured image of the real-world object into at least a first region and a second region;
    identifying a color value for the first region and a color value for the second region;
    identifying a color value variation for the first region;
    determining that the color value variation for the first region is greater than an upper threshold for a desired color value variation range;
    in response to determining that the color value variation for the first region is greater than the upper threshold, increasing a size of the first region;
    retrieving virtual content data based on an identification of the real-world object the color value for the first region, and the color value for the second region; and
    generating a visualization of virtual content from the virtual content data in a display of the viewing device, the virtual content including colors indicated by the color value for the first region and the color value for the second region.

11. A viewing device comprising:
one or more computer processors; and
one or more computer-readable mediums storing instructions that, when executed by the one or more computer processors, cause the viewing device to perform operations comprising:
   capturing, with an optical sensor of the viewing device, an image of a real-world object, yielding image data;
   identifying, based on the image data, the real-world object depicted in the image;
   processing the image data to divide the captured image of the real-world object into at least a first region and a second region;
   identifying a color value for the first region and a color value for the second region;
   identifying a color value variation for the first region;
   determining that the color value variation for the first region is greater than an upper threshold for a desired color value variation range;
   in response to determining that the color value variation for the first region is greater than the upper threshold, increasing a size of the first region;
   retrieving virtual content data based on an identification of the real-world object, the color value for the first region, and the color value for the second region; and
   generating a visualization of virtual content from the virtual content data in a display of the viewing device, the virtual content including colors indicated by the color value for the first region and the color value for the second region.

12. The viewing device of claim 11, the operations further comprising:
   identifying regions in the captured image having sample pixel color values within a predefined threshold; and
   dividing the captured image into a plurality of regions based on the identified regions.

13. The viewing device of claim 12, the operations further comprising:
   identifying a color value variation for the second region;
   determining that the color value variation for the second region is less than an lower threshold for the desired color value variation range; and
   in response to determining that the color value variation for the second region is less than the lower threshold, decreasing a size of the second region.

14. The viewing device of claim 11, the operations further comprising:
   computing a median color value for the first region.

15. The viewing device of claim 14, wherein computing the median color value for the first region comprises:
   selecting sample pixels from within the first region; and
   computing the median color value based on the sample pixels from within the first region.

16. The viewing device of claim 11, wherein the virtual content is a three-dimensional model that when virtualized in the display of the viewing device is visually perceived as an overlay on top of the captured image.

17. The viewing device of claim 16, the operations further comprising:
   retrieving a characteristic of the virtual content; and
   rendering a visualization of the characteristic of the virtual content in the display of the viewing device.

18. The viewing device of claim 17, wherein the characteristic includes an animation or a color of the virtual content, a first animation of the virtual object associated with a first color value, a second animation of the virtual object associated with a second color value, a first color of the virtual object associated with the first color value, a second color of the virtual object associated with the second color value.

19. The viewing device of claim 11, wherein the visualization of the virtual content is visually perceived as an overlay to the real-world object through the display of the viewing device, the display being a transparent display.

* * * * *